United States Patent [19]

Drouet et al.

[11] Patent Number: 5,166,102

[45] Date of Patent: Nov. 24, 1992

[54] GLASS COMPOSITIONS CONTAINING OXYGEN AND NITROGEN AND PRODUCTION OF NITROCERAMICS/VETROCERAMICS COMPOSITES THEREFROM

[75] Inventors: Claudette Drouet, Juillan; Yves Laurent, Cesson Sevigne; Erik Mennessier, Tarbes; Laurence Poquillon, Rennes; Patrick Verdier, Acigne, all of France

[73] Assignee: Ceramiques et Composites, Courbevoie, France

[21] Appl. No.: 599,417

[22] Filed: Oct. 18, 1990

[30] Foreign Application Priority Data

Oct. 18, 1989 [FR] France ............................... 89 13589

[51] Int. Cl.$^5$ ............... C03C 3/085; C03C 10/08; C04B 35/02; C04B 35/08
[52] U.S. Cl. .......................................... 501/9; 501/68; 501/69; 501/92; 501/95; 501/96; 501/97; 501/98; 501/32; 65/33
[58] Field of Search ............... 501/9, 32, 68, 72, 92, 501/95, 96, 97, 98, 69, 94, 56; 65/33

[56] References Cited

U.S. PATENT DOCUMENTS 4,711,860 12/1987 Gadkaree et al. ................ 501/9

FOREIGN PATENT DOCUMENTS 0239263 9/1987 European Pat. Off. .

OTHER PUBLICATIONS

Chemical Abstracts, vol. 104, No. 12, Mar. 1986, p. 336, resume No. 93899d, Columbus, Ohio, U.S., T. Hayashi et al.: "Formation and Crystallization of Oxynitride Glasses in the System Silicon, Aluminum, Magnesium-/Oxygen, Nitrogen", and Yogyo Kyokaishi 1986, 94(1), 44-52.

Collected Papers, XIV Int. Congr. on Glass, 1986, pp. 104-109, Indian Ceramic Society, Calcutta, In., P. K. Das et al.: "Nitrogen Glass in the System MgO-Al-N-SiO2".

Primary Examiner—Mark L. Bell
Assistant Examiner—Michael A. Marcheschi
Attorney, Agent, or Firm—Burns, Doane, Swecker & Mathis

[57] ABSTRACT

Glass compositions containing oxygen and nitrogen prepared by melting admixture of magnesia and/or a magnesium silicate, silica and an aluminum nitride produced by reacting ammonia with aluminum oxide, have the formula:

$$Mg_x Si_y Al\, O_u N_v \qquad (1)$$

in which $0.25 \leq x \leq 2.50$, $1.25 \leq y \leq 3.50$, $3.75 \leq u \leq 10.50$, and $0.05 \leq v \leq 0.75$, with the proviso that $2x+4y+3=2u+3v$; the subject glass compositions are thermally converted into vitroceramics having the same formula and including a single cordierite crystalline phase, which vitroceramics are well adapted for the production of composite shaped articles.

24 Claims, No Drawings

GLASS COMPOSITIONS CONTAINING OXYGEN AND NITROGEN AND PRODUCTION OF NITROCERAMICS/VETROCERAMICS COMPOSITES THEREFROM

BACKGROUND OF THE INVENTION

1. Field of the Invention

The present invention relates to novel glass composition comprising oxygen and nitrogen, hereinafter oxygen/nitrogen glass compositions, and more especially, to novel oxygen/nitrogen magnesium aluminosilicate compositions.

This invention also relates to precursors of such novel glass compositions and to the use of the novel glasses for the production of vitroceramic compositions and composite materials incorporating these vitroceramics.

2. Description of the Prior Art

It is known to this art that the presence of nitrogen in a vitreous matrix considerably modifies the physical and chemical properties of the glasses. Thus, in the case of oxygen/nitrogen glasses, there is an increase in the leaching resistance, an improvement in the mechanical characteristics, such as hardness and elastic moduli (Young's modulus, shear modulus, etc.), a reduction in their thermal expansion coefficient, a viscosity increase and a high Hruby factor value.

The increase in these latter two characteristics (viscosity, Hruby factor) results in a reduction in the recrystallization rate of the oxygen/nitrogen glasses. Therefore, this phenomenon is easier to control and the evolution of the crystallization, i.e., the characteristics of the vitroceramics, is slower during subsequent heat treatments.

With respect to such vitroceramic compositions, it is of interest to provide compositions of this type having very low expansion coefficients. Moreover, in the case of a composite material comprising a vitroceramic matrix and fibrous reinforcing material, the presence of nitrogen within the matrix is, as a result of its being a reducing agent, a desirable factor in regard to the protection of non-oxidized ceramic fibers.

It has already been proposed to prepare oxygen/nitrogen magnesium aluminosilicate glasses. However, the known processes generally permit the preparation of only very specific compositions. And even those processes permitting the preparation of possibly broader compositional ranges do not enable the production of vitroceramics therefrom that have an acceptable coefficient of expansion.

SUMMARY OF THE INVENTION

Accordingly, a major object of the present invention is the provision of a wide range of novel oxygen/nitrogen magnesium aluminosilicate glass compositions.

Another object of the invention is the provision of novel vitroceramic compositions having improved mechanical properties and novel composite shaped articles produced therefrom.

Briefly, the oxygen/nitrogen glass compositions of the present invention have the formula:

$$Mg_x Si_y Al O_u N_v \qquad (1)$$

in which $0.25 \leq x \leq 2.50$, $1.25 \leq y \leq 3.50$, $3.75 \leq u \leq 10.50$, $0.05 \leq v \leq 0.75$, with the proviso that $2x+4y+3=2u+3v$.

DETAILED DESCRIPTION OF THE PREFERRED EMBODIMENTS OF THE INVENTION

More particularly according to the present invention, the subject vitroceramic compositions have a crystalline phase of the cordierite type corresponding to the formula:

$$Mg_x Si_y Al O_u N_v \qquad (1)$$

in which $0.25 \leq x \leq 2.50$, $1.25 \leq y \leq 3.50$, $3.75 \leq u \leq 10.50$, $0.05 \leq v \leq 0.75$, with the proviso that $2x+4y+3=2u+3v$.

This invention also features composite materials which comprises a reinforcing agent and a vitroceramic matrix having the composition indicated above.

The present invention lastly features precursors of oxygen/nitrogen magnesium aluminosilicate glass compositions that are based on magnesium silicate, silica and aluminum nitride, such nitride having been itself prepared by reacting ammonia with aluminum oxide.

The glass compositions according to the invention can have a high nitrogen content. The vitroceramics produced from these compositions have very low expansion coefficients, e.g., a value of $\alpha_{20}^{700}$ of at most $2.2 \times 10^{-6} °C^{-1}$.

As indicated above, the glass compositions according to the invention are based on magnesium, silicon, aluminum, oxygen and nitrogen and correspond to the formula (1) $Mg_x Si_y Al O_u N_v$, in which x, y, u and v are as defined above and $2x+4y+3=2u+3v$.

In a preferred embodiment of the invention, the glass compositions have the formula (1) in which $0.25 \leq x \leq 1.75$ and $3.75 \leq u \leq 10.5$, with y and v being unchanged.

In another preferred embodiment of the invention, the glass compositions have the formula (1) in which $x=1$, $2 \leq y \leq 3$, $6.5 \leq u \leq 8$, $0.1 \leq v \leq 0.3$.

The process for the preparation of such compositions will now be described.

This process utilizes a specific precursor composition, which is based on silica and aluminum nitride. It also comprises, as the constituent providing magnesium, at least one constituent selected from among magnesia and magnesium silicates. The magnesium silicate can be used in the form of $MgSiO_3$ or $2MgOSiO_2$.

The aluminum nitride is of a particular type, and comprises the reaction product of ammonia with aluminum oxide.

It is known to the art that, normally, aluminum nitride is prepared by carbonitriding alumina in accordance with the reaction:

$$Al_2O_3 + 3C + N_2 \rightarrow AlN + 3CO$$

This reaction is carried out at a temperature ranging from 1,600° to 1,800° C.

According to the present invention, the aluminum nitride is prepared by reacting excess ammonia with aluminum oxide in powder form. This reaction is carried out at a temperature which is a function of the molar ratio of ammonia to alumina (typically ranging from 3 to 5) and at temperatures ranging from 1000° to 1,400° C., preferably at about 1,200° C. At this temperature, the ammonia dissociates, which explains its high reactivity. It is therefore necessary to conduct the operation under conditions such that the ammonia decomposes in contact with the aluminum oxide.

The aluminum oxide used, having an average grain size of approximately 1μ, is heated in the reaction furnace to approximately 1,200° C. The ammonia flow, at a temperature below its dissociation point, is introduced into the furnace and reacts with the aluminum oxide to produce the aluminum nitride.

For example, it is possible to use the commercial alumina VENTRON having a average grain size of 1 μm up to 99.99%. This provides an aluminum nitride having an average grain size of 0.2 μm and a BET specific surface of approximately 10 m²/g. The completion of the reaction is monitored by mass variation and X-ray crystallographic analysis. The nitride produced is in the form if a slightly hygroscopic, white powder. The purity of the nitride is determined by analyzing the nitrogen content and measuring the density (p). The nitrogen percentage is 33.8% by weight and it has a p value of approximately 3.18 g/cm³.

It will be appreciated that according to the invention the nitrogen and aluminum are provided in the form of aluminum nitride, and a specific aluminum nitride of the aforementioned type is used. However, the aluminum can also be partly supplied in alumina form, preferably with a purity of at least 2N5 combined with aluminum nitride. Another suitable aluminum source is aluminum in form AlON, i.e., aluminum oxynitride in spinel form.

More specifically, a suitable precursor composition has the following molar composition, expressed as the oxide or nitride of the different elements:

$12\% \leq MgO \leq 35\%$
$55\% \leq SiO_2 \leq 70\%$
$4\% \leq Al_2O_3 \leq 24\%$
$0 < AlN \leq 14\%$.

It is more especially preferred to use precursor compositions of the above type in which:

$23\% \leq MgO \leq 34\%$
$56\% \leq SiO_2 \leq 62\%$
$6\% \leq Al_2O_3 \leq 11\%$
$3\% \leq AlN \leq 7\%$.

This composition is typically used in powder form.

The precursor composition of the aforementioned type is heated until it is melted. The, heating can be carried out by any known means, e.g., using an induction furnace.

Heating normally is carried out in a controlled atmosphere and in a neutral gas, particularly oxygen-free nitrogen. The melting point is normally approximately 1,500° C. The product is maintained at this temperature for the time necessary for its homogenization. The product is then cooled. The glass composition according to the invention is then obtained.

To produce a vitroceramic composition, the previously obtained glass composition is subjected to a heat treatment, generally at a temperature of at least 1,100° C. and close to its crystallization point. It results in recrystallization of the glass composition.

It should be appreciated that in this event only a single crystalline phase is formed, namely, cordierite. Moreover, said crystallization can be carried out in the absence of any additive. However, said recrystallization can be rendered more homogeneous by adding nucleating agents, e.g., zirconium oxide.

The vitroceramic composition according to the present invention has the composition given above. In a preferred embodiment, the vitroceramic has the above formula (1) in which $0.25 \leq x \leq 1.75$ and $3.75 \leq u \leq 10.5$, with y and v being as above. In another preferred embodiment, said composition is in accordance with the above formula (1), in which:

$x=1$
$2 \leq y \leq 3$
$6.5 \leq u \leq 8$
$0.1 \leq v \leq 0.3$.

As indicated above, this invention also features a vitroceramic matrix composite material. This matrix has the composition of the vitroceramic hereinbefore described. In addition, the composite material according to the invention incorporates a reinforcing agent.

The reinforcing agent is typically a fibrous agent, e.g., ceramic reinforcements constituted by an assembly, organized or in random form, of long, continuous ceramic fibers. Thus, the fibers used can be in the matrix in a unidirectional configuration, or in the form of fabrics, or non-woven mats, or in a multidirectional configuration.

Optionally, the reinforcing agents could be in the form of short fibers, whiskers and mixtures thereof, orientated in a random manner in the matrix. It is also possible to use as reinforcing agents long fibers in combination with whiskers, short fibers dispersed within the matrix and mixtures thereof.

From the mechanical strength standpoint, the preferred composite materials according to the invention are those either having a unidirectional fibrous reinforcement, i.e., constituted by fibers which are substantially all parallel to one another and oriented in the same direction (composite 1D), or having a bidirectional fibrous reinforcement, i.e., constituted by fibers which are all substantially parallel to one another, but whose direction crosses in two successive horizontal planes, the crossing angle advantageously being 90° in order to provide the optimum mechanical properties (composite 2D).

Ceramic fibers suitable as the reinforcing agent are those of carbon, boron, alumina, alumina/silica, alumina/silica/boron, silicon carbide, silicon nitride, boron nitride and silicon carbonitride. Obviously, it is also possible to use mixtures of fibers of a different ceramic nature for constituting the reinforcement.

Silicon carbide ceramic fibers are particularly suitable for producing composites having high thermomechanical properties.

The fraction by volume of the reinforcing agent in the composite material advantageously ranges from 20% to 70% and preferably from 30% to 50%.

The process for the production of the composite material according to the invention comprises the following stages:

(a) impregnating the reinforcing agent with a slip or slop containing the glass composition as described above;

(b) drying the thus impregnated reinforcing agent to provide a preimpregnated product (prepreg);

(c) densifying the preimpregnated product; and (d) heat-treating the stage (c) densified product.

More particularly, a slip is formed from the glass composition as described hereinbefore as a matched grain size powder, e.g., having a particle size below 50 μm and preferably below 10 μm.

The rheology and wettability properties of the slip are adjusted in conventional manner by adding binders and solvents of appropriate nature and in appropriate proportions. The solvents are eliminated during the drying stage. In a second stage, the impregnated reinforcing agent from the preceding stage is dried.

Optionally, the impregnation and drying stages can be repeated until a preimpregnated product is obtained having the desired fraction by volume of the reinforcing agent.

In one embodiment of the process of the invention, more particularly suitable for the preparation of composites 1D and 2D as described above, it is also possible to effect a stacking and then bonding together of identical preimpregnated products in the form of composite sheets having a unidirectional fibrous reinforcement, the stacking been done either by maintaining parallel (composite 1D) or by intersecting (composite 2D) the directions of the fibers of the superimposed sheets.

The third stage of the process is densification or fritting. However, prior to carrying out fritting under load, or sintering of the impregnated, dried preform, it is preferable to partly or totally eliminate the various binders used in the preparation of the slip. This so-called cleaning operation is conventionally carried out by moderate heat treatment of the preform in air, or under a neutral atmosphere. Densification or fritting is carried out by heating, preferably under pressure.

In a manner known, per se, it is preferable to carry out the densification or fritting treatment in a neutral atmosphere.

The final stage of the process is a heat or recrystallization treatment. This stage develops the crystalline structure in the amorphous matrix produced as a result of the preceding stages. This treatment is carried out at a temperature of at least 1,100° C. and generally without pressure. It is continued for a few hours, e.g., 2 to 6 hours.

In order to further illustrate the present invention and the advantages thereof, the following specific examples are given, it being understood that same are intended only as illustrative and in nowise limitative.

EXAMPLE 1

This example describes the preparation of two glass compositions $C_1$ and $C_2$ according to the invention.

Magnesium silicate ($MgSiO_3$), silicon dioxide, aluminum oxide and aluminum nitride prepared by reacting ammonia with aluminum oxide were ground and mixed.

The respective proportions of these elements are given below, in g, for each of the compositions:

|  | $C_1$ | $C_2$ |
| --- | --- | --- |
| $MgSiO_3$ | 10.334 | 2.087 |
| $SiO_2$ | 9.556 | 1.922 |
| $Al_2O_3$ | 4.532 | 0.770 |
| AlN | 0.575 | 0.230 |

The pulverulent mixture was placed in a molybdenum crucible, which was heated in an induction furnace to 1,500° C. in oxygen-free nitrogen. The liquid obtained was cooled by pouring.

The following two glass compositions $C_1$ and $C_2$ were obtained:

$C_1$: Mg $Si_{2.55}$ Al $O_{7.4}$ $N_{0.135}$ $C_2$: Mg $Si_{2.55}$ Al $O_{7.2}$ $N_{0.27}$

The principal characteristics of these glasses were as follows:

|  | $C_1$ | $C_2$ |
| --- | --- | --- |
| Tg (glass transition point) | 840° C. | 867° C. |
| Tc (crystallization point) | 1120° C. | 1155° C. |
| Tf (melting point) | 1315° C. | 1293° C. |
| Hr (Hruby factor) | 1.44 | 2.09 |
| p (density in g.cm$^{-3}$) | 2.61 | 2.64 |
| Thermal expansion coefficent: |  |  |
| $\alpha_{20}^{700} \times (10^{-6°} C.^{-1})$ | 4.55 | 4.70 |

EXAMPLE 3

Glass composite $C_1$ was subjected to a heat treatment at 1,120° C. to provide a vitroceramic. X-ray crystallographic analysis revealed the existence of cordierite only as the crystalline phase. The expansion coefficient values are reported below as a function of the duration of the heat treatment:

| Time (h) | $\alpha_{20}^{700} \times (10^{-6°} C.^{-1})$ |
| --- | --- |
| 0.5 | 4.25 |
| 1.0 | 2.25 |
| 1.5 | 2.19 |
| 2.5 | 2.09 |

EXAMPLE 3

Glass composition $C_1$ was used. It was ground until a powder was obtained having a grain diameter below 10 μm. From this powder was prepared an impregnation slip having the following composition:

| Preground glass | 10.00 kg |
| --- | --- |
| Polystyrene | 1.07 kg |
| Paraffin | 0.16 kg |
| Dioctyl phthalate | 0.96 kg |
| Cyclohexane | 10.6 liters. |

The slip was introduced into a 50 liter alumina grinder with 50 kg of alumina spheres and grinding was carried out for 15 hours. This slip was then used to impregnate SiC fibers. The plates were wound onto a polygonal mandrel. Sheets were cut and a stack was formed at 0° C.

Cleaning was carried out in air or a neutral atmosphere. Fritting was carried out under load at 1,250° C. for 1 hour. The shaping pressure was 15 MPa. This was followed by rapid cooling to provide a material having the following characteristics.

| 3-Point bending break stress: | 270 MPa |
| --- | --- |
| Density: | 2.51 |
| Open porosity: | zero |
| X-ray diffraction: | crystalline matrix in cordierite form |
| Expansion coefficient between 20° and 700° C.: | 2.9 $10^{-6°}$ $C.^{-1}$. |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An oxygen/nitrogen glass composition of the formula:

$$Mg_x Si_y Al O_u N_v \qquad (1)$$

in which $0.25 \leq x \leq 2.50$, $1.25 \leq y \leq 3.50$, $3.75 \leq u \leq 10.50$, and $0.05 \leq v \leq 0.75$, with the proviso that $2x+4y+3=2u+3v$ which composition when heated is converted to a vitroceramic composition having a single cordierite crystalline phase.

2. The glass composition as defined by claim 1, wherein formula (1), $0.25 \leq x \leq 1.75$ and $3.75 \leq u \leq 10.5$ 3. The glass composition as defined by claim 1, wherein formula (1), $x=1$, $2 \leq y \leq 3$, $6.5 \leq u \leq 8$, and $0.1 \leq c \leq 0.3$.

4. A vitroceramic composition comprising a single cordierite crystalline phase and having the formula:

$$Mg_x Si_y Al O_u N_v \qquad (1)$$

in which $0.25 \leq x \leq 2.50$, $1.25 \leq y \leq 3.50$, $3.75 \leq u \leq 10.50$, and $0.05 \leq v \leq 0.75$, with the proviso that $2x+4y+3=2u+3v$.

5. The vitroceramic composition as defined in claim 4, wherein formula (1), $0.25 \leq x \leq 1.75$ and $3.75 \leq u \leq 10.5$.

6. The vitroceramic composition as defined by claim 4, wherein formula (1), $x=1$, $2 \leq y \leq 3$, $6.5 \leq u \leq 8$, and $0.1 \leq v \leq 0.3$.

7. A composite shaped article comprising a vitroceramic matrix having the composition as defined by claim 4, and a reinforcing amount of a reinforcing agent therefor.

8. The composite shaped article as defined by claim 7, wherein the reinforcing agent is in fiber form.

9. The composite shaped article as defined by claim 8, wherein the reinforcing agent is a ceramic material.

10. The composite shaped article as defined by claim 9, wherein said ceramic material is at least one selected from the group consisting of carbon, boron, alumina, alumina/silica, alumina/silica/boron, silicon carbide, silicon nitride, boron nitride or silicon carbonitride.

11. The composite shaped article as defined by claim 7, comprising from 20% to 70% by volume of said reinforcing agent.

12. The composite shaped article as defined by claim 1, comprising from 30% to 50% by volume of said reinforcing agent.

13. An oxygen/nitrogen magnesium aluminosilicate glass precursor composition having a single cordierite crystalline phase, comprising an admixture of silica, aluminum nitride and at least one selected from the group consisting of magnesia or magnesium silicate wherein said aluminum nitride is prepared by reacting ammonia with aluminum oxide.

14. The glass precursor composition as defined by claim 13, said admixture comprising a powder of said constituents.

15. The glass precursor composition as defined by claim 13, further comprising aluminum oxide.

16. The glass precursor composition as defined by claim 13, comprising the following constituents in the molar percentages indicated:

$12\% \leq MgO \leq 35\%$
$55\% \leq SiO_2 \leq 70\%$
$4\% \leq Al_2O_3 \leq 24\%$
$0 < AlN \leq 14\%$.

17. The glass precursor composition as defined by claim 16, comprising the following constituents in the molar percentages indicated:

$23\% \leq MgO \leq 34\%$
$56\% \leq SiO_2 \leq 62\%$
$6\% \leq Al_2O_3 \leq 11\%$
$3\% \leq AlN \leq 7\%$.

18. A process for the preparation of the oxygen/nitrogen glass composition as defined by claim 1, comprising melting an admixture of silica, aluminum nitride and at least one selected from the group consisting of magnesia or magnesium silicate wherein said aluminum nitride is prepared by reacting ammonia with aluminum oxide.

19. The process as defined by claim 18, comprising carrying out such melting in a neutral atmosphere.

20. The process as defined by claim 19, said neutral atmosphere comprising nitrogen.

21. A process for the preparation of the vitroceramic composition as defined by claim 4, comprising heat-treating an oxygen/nitrogen glass composition of the formula:

$$Mg_x Si_y Al O_u N_v \qquad (1)$$

in which $0.25 \leq x \leq 2.50$, $1.25 \leq y \leq 3.50$, $3.75 \leq u \leq 10.50$, and $0.05 \leq v \leq 0.75$, with the proviso that $2x+4y+3=2u+3v$.

22. The process as defined by claim 21, comprising heat-treating at a temperature of at least 1,100° C.

23. A process for the preparation of the composite shaped article as defined by claim 7, which comprises (a) impregnating the reinforcing agent with a slip comprising an oxygen/nitrogen glass composition of the formula:

$$Mg_x Si_y Al O_u N_v \qquad (1)$$

in which $0.25 \leq x \leq 2.50$, $1.25 \leq y \leq 3.50$, $3.75 \leq u \leq 10.50$, and $0.05 \leq v \leq 0.75$, with the proviso that $2x+4y+3=2u+3v$, (b) drying the thus impregnated reinforcing agent to provide a prepreg thereof, (c) densifying said prepreg, and (d) heat-treating said densified prepreg.

24. The process as defined by claim 23, comprising heat-treating at a temperature of at least 1,100° C.

* * * * *